United States Patent [19]

Matoba et al.

[11] Patent Number: 5,331,623
[45] Date of Patent: * Jul. 19, 1994

[54] OPTICAL RETRIEVAL SYSTEM FOR ENCODING PIT ANGULAR DATA AND OPTICAL RECORDING ELEMENT THEREFOR

[75] Inventors: Hirotsugu Matoba, Sakurai; Toshihisa Deguchi, Nara; Shigeo Terashima, Tenri; Hideyoshi Yamaoka, Matsubara, all of Japan

[73] Assignee: Sharp Kabushiki Kaisha, Osaka, Japan

[*] Notice: The portion of the term of this patent subsequent to Apr. 6, 2010 has been disclaimed.

[21] Appl. No.: 948,098

[22] Filed: Sep. 21, 1992

Related U.S. Application Data

[62] Division of Ser. No. 453,927, Dec. 19, 1989, Pat. No. 5,200,941.

[30] Foreign Application Priority Data

Dec. 27, 1988 [JP] Japan ................................ 63-330952

[51] Int. Cl.$^5$ .............................................. G11B 7/00
[52] U.S. Cl. ................................... 369/124; 369/109; 369/120; 369/44.26; 369/275.3; 369/275.4
[58] Field of Search ............... 369/100, 109, 110, 111, 369/120, 275.3, 275.4, 44.41, 44.42, 44.23, 44.26, 44.11, 124

[56] References Cited

U.S. PATENT DOCUMENTS

| | | | |
|---|---|---|---|
| 4,310,916 | 1/1982 | Dil | 369/109 |
| 4,562,564 | 12/1985 | Bricot et al. | |
| 4,707,648 | 11/1987 | Minami | 369/44.41 |
| 4,961,182 | 10/1990 | Saito et al. | 369/124 |
| 4,967,403 | 10/1990 | Ogawa et al. | 369/275.3 |
| 4,998,234 | 3/1991 | Rees et al. | 369/44.41 |
| 5,200,941 | 4/1993 | Matoba et al. | 369/44.26 |

FOREIGN PATENT DOCUMENTS

| | | |
|---|---|---|
| 82716 | 6/1983 | European Pat. Off. |
| 63-268140 | 11/1988 | Japan |
| 63-269379 | 11/1988 | Japan |
| 2058434 | 4/1981 | United Kingdom |

*Primary Examiner*—Aristotelis Psitos
*Assistant Examiner*—P. W. Huber

[57] ABSTRACT

In the optical recording element of the invention, alignments of long thin pits inclined in various directions with respect to the track direction are formed on the tracks and information is recorded therein according to the different inclines of the pits, thereby performing higher-density and larger-volume recording without reducing the spacing between each pit and the track pitch. The invention also discloses an optical data retrieval system for use with the above optical recording element, which scans the pit alignments with a laser beam spot, detects the inclines of the pits by obtaining the distribution of the intensity of reflected light which is caused by light diffraction at the pits, and plays back information in accordance with the inclines. Therefore, not only can the substantially same structure as that of a standard type optical data retrieval system be applied to the invention without making any complicated change, but also cross-talk is less likely to be produced in the read out signals.

17 Claims, 5 Drawing Sheets

LASER BEAM SPOT

FIG.6(a)

LASER BEAM SPOT

FIG.7(a)

LASER BEAM SPOT

FIG.8(a)

LASER BEAM SPOT

| | |
|---|---|
| S12(d1+d2) | — |
| S23(d2+d3) | — |
| S34(d3+d4) | — |
| S45(d4+d5) | MAX. |

CODE "00"

FIG.6(c)

| | |
|---|---|
| S12(d1+d2) | — |
| S23(d2+d3) | MAX. |
| S34(d3+d4) | — |
| S45(d4+d5) | — |

CODE "11"

FIG.7(c)

| | |
|---|---|
| S12(d1+d2) | MAX. |
| S23(d2+d3) | — |
| S34(d3+d4) | — |
| S45(d4+d5) | — |

CODE "01"

FIG.8(c)

| | |
|---|---|
| S12(d1+d2) | — |
| S23(d2+d3) | — |
| S34(d3+d4) | MAX. |
| S45(d4+d5) | — |

CODE "10"

OPTICAL RETRIEVAL SYSTEM FOR ENCODING PIT ANGULAR DATA AND OPTICAL RECORDING ELEMENT THEREFOR

This application is a divisional of application Ser. No. 453,927, filed Dec. 19, 1989, now U.S. Pat. No. 5,200,941.

FIELD OF THE INVENTION

The present invention relates to optical recording elements wherein information is stored by pits formed on the tracks, and optical data retrieval systems capable of playing back the information by projecting a light beam onto the optical recording element.

BACKGROUND OF THE INVENTION

Optical disks functioning as an optical recording element from which information is played back with a light beam have been already known as a high density and high storage capacity recording medium. Of these optical disks, optical disks used only for the playback of information such as optical ROM disks are particularly widely known. In an optical ROM disk, application software for a computer and various data are already stored in the form of pit alignments on the disk. A data retrieval system for use with such an optical ROM disk is designed such that the presence/absence of a pit is detected by scanning the pit alignments with a laser beam which is used as a light beam; the presence/absence of a pit is electrically represented by a binary signal; and stored information is played back in accordance with the binary signal.

Figure 9A:
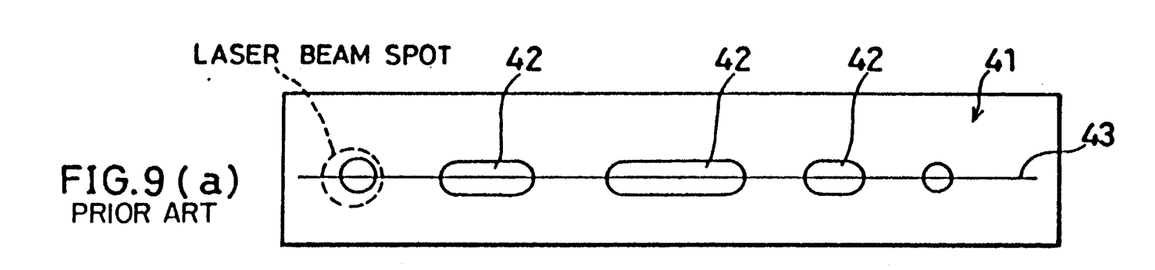
FIG. 9(a) is a prior art diagrammatical view of an alignment of pits.
Figure 9B:
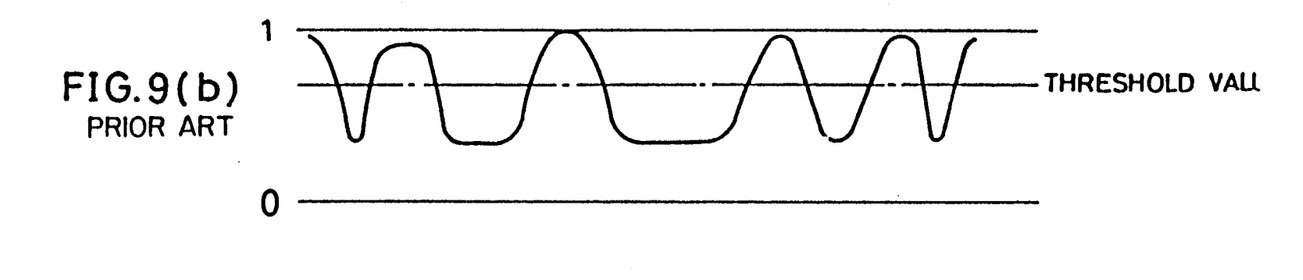
FIG. 9(b) is a prior art waveform chart showing the waveform of an output signal read out by a photodetector.
Figure 9C:
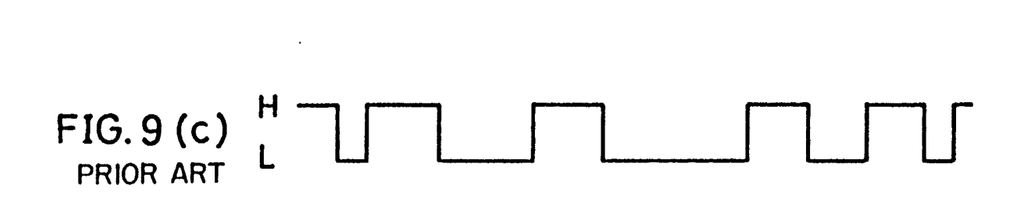
FIG. 9(c) is a prior art waveform chart showing the waveform of a binary signal corresponding to the output signal shown in FIG. 9(b).

More concretely, as shown in FIG. 9(a), when a laser beam spot scans the alignment of pits 42 formed on a track 43 on an optical disk 41, the intensity of reflected light decreases as the laser beam enters the pit 42 due to light diffraction. The electric output of a read-out signal is changed in accordance with the presence/absence of the pits 42, namely, it decreases when the laser beam scans the pit 42, and increases when the laser beam scans the flat area where no pit 42 is formed, as shown in FIG. 9(b). The output of the signal is converted to a binary code with a predetermined threshold value to obtain a binary signal as shown in FIG. 9(c).

In the conventional optical disk 41, information recorded by the pit 42 is represented by 0 or 1 and therefore the information volume thereof is not more than 1 bit. In order to enable optical disks to perform higher-density recording and have higher storage capacity, the length of the smallest pits has to be shortened to reduce the spacing between each pit, or the track pitch has to be reduced. This, however, requires an improvement in the frequency characteristic of the optical head to a considerable extent and causes more cross-talk in reading out signals. In other words, the use of an optical disk in which the pit spacing and track pitch are reduced in order to achieve higher-density and large-volume recording, has the disadvantage of overloading the optical disk data retrieval system used for driving such a disk.

SUMMARY OF THE INVENTION

It is one of the objects of the present invention to provide an optical recording element capable of performing high-density and large-volume recording without reducing the pit spacing and track pitch.

It is another object of the present invention to provide an optical data retrieval system capable of at least playing back information with the use of the above optical recording element.

In order to accomplish the above objects, an optical recording element according to the present invention is designed to have long thin pits which are aligned on the tracks and inclined in various directions with respect to the track direction, whereby information is stored therein according to the different inclines of the pits.

An optical data retrieval system according to the present invention is designed to be used with the optical recording element having the above arrangement and characterized in that the pit alignments formed on the optical recording element is scanned with a laser beam spot; the inclines of the pits are detected by obtaining the distribution of the intensity of reflected light caused due to light diffraction at the pits, and information is played back in accordance with the inclines.

According to the invention, since information is not recorded by the presence/absence of a pit but recorded by the difference in the inclines of the pits with respect to the track direction, information volume per pit increases. This allows the optical recording element to perform higher-density and larger-volume recording, without shortening the length of the pits to reduce the spacing therebetween and the track pitch.

Also, since the pit alignments are scanned with a laser beam spot and the inclines of the pits are detected from the distribution of the intensity of reflected light, the substantially same structure as that of a standard type data retrieval system can be adapted without making any complicated change. Furthermore, the pit spacing and track pitch are not reduced in the optical recording element. Hence, there is no need to drastically improve the frequency characteristic of the optical head and cross-talk is less likely to occur.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 8 show one embodiment of the present invention.

DESCRIPTION OF THE EMBODIMENTS

Referring now to FIGS. 1 through 8, one embodiment of the present invention will be explained hereinbelow.

Figure 1:
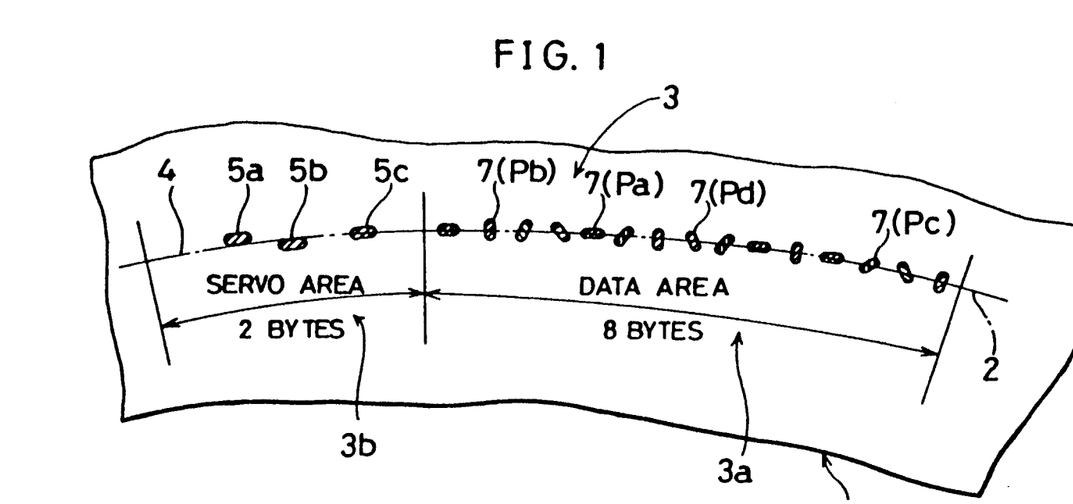
FIG. 1 is a view showing an alignment of pits formed on an optical disk which functions as an optical recording element.
Figure 2:
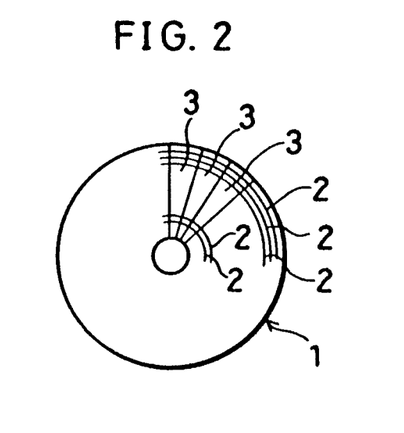
FIG. 2 is a plan view of the optical disk.

An optical disk 1 functioning as an optical recording element is e.g. 90 mm in diameter and has e.g. about 10,000 spiral tracks 2 on the surface thereof as shown in FIG. 2. Each track 2 (one round of track) is divided into 22 sectors 3 for example, and the sector 3 is treated as a unit in recording information. As shown in FIG. 1, each sector 3 comprises a data area 3a for storing 8 bytes of information and a servo area 3b in which information equivalent to 2 bytes, used for the generation of a channel clock signal and the control of the servo mechanisms in the data retrieval system are stored.

The servo area 3b is provided with pits 5a, 5b and 5c as well as mirror section 4. The pits 5a and 5b are used for controlling a tracking servo mechanism and diagonally placed with the track 2 therebetween, being equidistant from the center of the track 2 in the radial direction of the optical disk 1, in order for a laser beam spot not to be irradiated to them at the same time. This arrangement allows a laser beam spot to accurately track the elaborately formed tracks. To be more specific, the levels of the detection signals based on the reflected lights of the laser beam from the pits 5a and 5b are controlled to be equal, whereby the laser beam spot is prevented from being out of the track 2 in the radial direction of the optical disk 1 and accurate tracking can be thus performed. On the other hand, the pit 5c is formed on the center of the track 2 and used for the generation of a channel clock signal. The output signal read out from the pit 5c in each servo area 3b is entered in a circuit to which PLL (Phase Locked Loop) method is adapted, and a channel clock signal is generated. The mirror section 4 is a flat area used for controlling a focus servo mechanism, where no pit exists. An objective lens 19 (see FIG. 4) is moved in a focus direction by the focus servo mechanism so that a laser beam is always converged on the recording surface of the optical disk 1.

Information to be played back is stored in the form of an alignment of pits 7 inclined in various directions with respect to the track direction, in the data area 3a formed in each sector 3. In this embodiment, 4 types of pits are employed, i.e. pits inclined at 0° to the track direction (Pa); pits inclined at 90° to the same (Pb); pits inclined at about 45° to the same in a counterclockwise direction (Pc); and pits inclined at about 45° to the same in a clockwise direction (Pd). Each type of pits has a fixed code. For instance, the pits Pa are represented by "00", the pits Pb "11", the pit Pc "01" and the pit Pd "10". Since one pit has two pieces of information combined together, each information being represented by 0 or 1, the information volume per pit is 2 bits in this embodiment.

Figure 4:
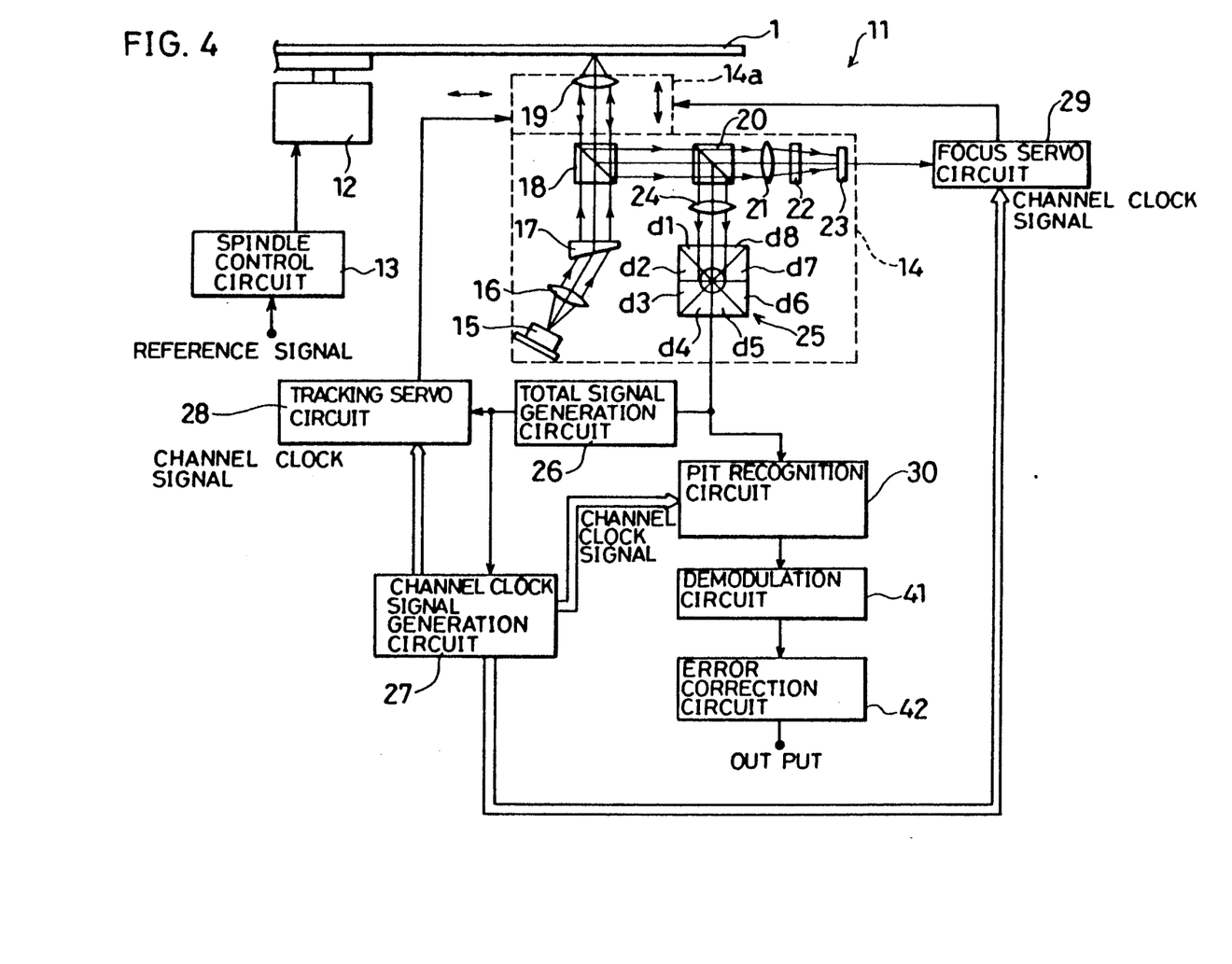
FIG. 4 is a schematic block diagram of an optical disk data retrieval system used as an optical data retrieval system.

The optical disk data retrieval system 11 functioning as an optical data retrieval system comprises, as shown in FIG. 4, a spindle motor 12 for rotatively driving the optical disk 1 at a fixed angular velocity for example. The spindle motor 12 is connected to a spindle control circuit 13 which controls the spindle motor 12 in accordance with a reference signal entered therein.

Under the optical disk I is disposed an optical pick-up 14 which functions as an optical pick-up device and can move in the focus direction and track direction. In the optical pick-up 14, a laser beam emitted from a semiconductor laser 15 is directed to a collimating lens 16 to produce a parallel beam. The parallel beam is shaped by a shaping prism 17 and then projected to an objective lens 19 via a polarized beam splitter 18. Thereafter, the beam is converged by the objective lens 19 to produce a laser beam spot irradiated on the optical disk 1. The laser beam reflected at the optical disk 1 (hereinafter referred to as a reflected beam) is projected back to the objective lens 19 and the polarized beam splitter 18. The reflected beam then passes through another polarized beam splitter 20 to be split off. One of the reflected beams thus split is guided into a photodetector 23 after passing through a lens 21 and a cylindrical lens 22. The output from the photodetector 23 is entered into a focus servo circuit 29. On the other hand, the other reflected beam is guided into a photodetector 25 via a lens 24.

The photodetector 25 has a rectangular light receiving surface which is equally divided into eight light receiving areas d1 to d8 with parting lines (i.e. two diagonal lines and two lines each extending between the middle points of the opposite sides) so that those light receiving areas d1 to d8 are equal in size. The photodetector 25 is connected to a total signal generation circuit 26 which generates a total signal by summing up the outputs of the light receiving areas d1 to d8. The total signal generation circuit 26 is connected to a channel clock signal generation circuit 27 which functions as the aforesaid circuit of PLL method. The channel clock signal generation circuit 27 generates a channel clock signal based on the total signal for the pit 5c formed on the servo area 3b and this channel clock signal is sent to a tracking servo circuit 28, a focus servo circuit 29 and a pit recognition circuit 30 functioning as pit recognition retrieval means.

The tracking servo circuit 28 generates and releases a control signal to an objective lens actuating mechanism 14a upon receipt of the channel clock signal from the channel clock signal generation circuit 27 so that total signals each corresponding to the pits 5a and 5b formed in the servo area 3b are equal. Likewise, the focus servo circuit 29 releases a control signal to the objective lens actuating mechanism 14a upon receipt of the channel clock signal, the control signal being generated by astigmatism according to the output of the photodetector 23 which corresponds to the mirror section 4 formed in the servo area 3b.

Figure 3:
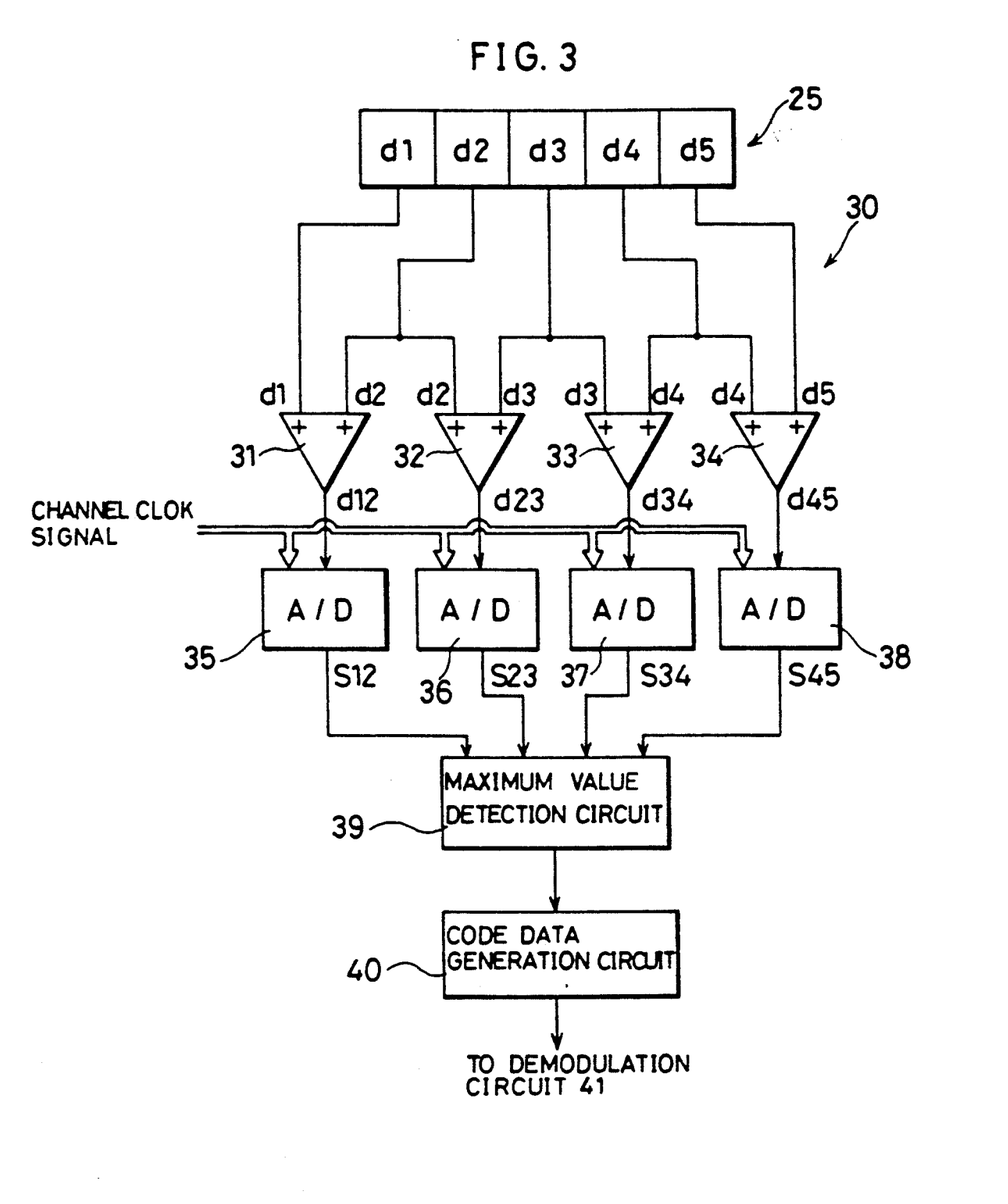
FIG. 3 is a block diagram of a pit recognition circuit.

The pit recognition circuit 30 is connected to the photodetector 25. As shown in FIG. 3, the pit recognition circuit 30 comprises circuit members such as adders the number of which is the same as the number of types of the pits 7 classified according to the inclines thereof (in this embodiment, four adders 31 to 34 are employed); the same number of A/D converters; (in this embodiment, four A/D converters 35 to 38 are employed); and a maximum value detection circuit 39; and a code data generation circuit 40.

Incidentally, when the distribution of reflected light intensity is detected in a combination of two adjacent light receiving areas, eight combinations of two adjacent light receiving areas (d1-d2, d2-d3, d3-d4, d4-d5, d5-d6, d6-d7, d7-d8, d8-d1) are available. However, in order to obtain the overall distribution of reflected light intensity, the distribution of reflected light intensity in four successive combinations (in this embodiment, the combinations d1-d2, d2-d3, d3-d4 and d4-d5 are selected) may be detected for the following reason. That is, the center of the laser beam spot is controlled by the tracking servo mechanism to substantially coincide with the center of the pit 7, the distribution of reflected light intensity is symmetrical about the center of the light receiving surface of the photodetector 25.

The adder 31 generates a sum signal d12 based on analog signals varying in accordance with the amount of light received at the light receiving areas d1 and d2 which are adjacent to each other, while the adder 32 generates a sum signal d23 based on analog signals released from the light receiving areas d2 and d3. The adder 33 generates a sum signal d34 based on analog signals from the light receiving areas d3 and d4, and the adder 34 generates a sum signal d45 based on analog signals from the light receiving areas d4 and d5. The sum signals d12, d23, d34 and d45 are entered together with the channel clock signal into the A/D converters 35, 36, 37 and 38 respectively.

When the channel clock signal generated synchronously with the reading out of information stored in each sector 3 is entered, the A/D converters 35 to 38 respectively converts the sum signals d12, d23, d34 and d45, which are detected from light reflected at the pit 7, to digital signals S12, S23, S34 and S45 in order to release to the maximum value detection circuit 39.

Figures 5A, 5B, 5C:
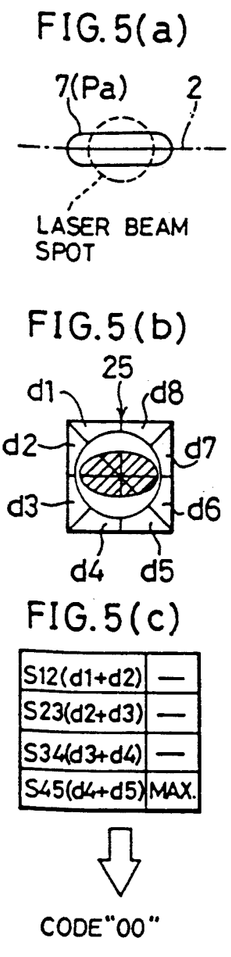
FIGS. 5(a), 6(a), 7(a) and 8(a) are diagrammatical views of pits each of which has a predetermined incline with respect to a track direction.
FIGS. 5(b), 6(b), 7(b) and 8(b) are views showing the distribution of light intensity on a photodetector.
FIGS. 5(c), 6(c), 7(c) and 8(c) are views showing code preparation.

The maximum value detection circuit 39 selects a digital signal having a maximum value from the digital signals S12, S23, S34 and S45. The maximum value signal thus selected is converted to the predetermined code by a code data generation circuit 40. For instance, the digital signal S12 is converted to the code "01". Likewise, the digital signal S23, S34 and S45 are converted to the codes "11", "10" and "00" respectively The coded signal is entered, as shown in FIG. 4, to a demodulation circuit 41 and then to an error correction circuit 42 from which a read out signal is released. In the foregoing arrangement, when a laser beam spot is projected to the pit Pa as shown in FIG. 5(a), the distribution of light intensity on the light receiving surface of the photodetector 25 is as shown in FIG. 5(b). That is to say, light intensity increases in the region where light reflected at the outside of the pit Pa is received (i.e. the dark shaded part in FIG. 5(b)) and light intensity decreases in the regions where light reflected within the pit Pa is received (the hatched part in FIG. 5(b)), because a laser beam is diffracted at the pit Pa. In this case, among the combinations of two adjacent light receiving areas (i.e. the combinations of light receiving areas d1-d2, d2-d3, d3-d4, and d4-d5), the combination of the adjacent light receiving areas d4 and d5 has the highest light intensity, because the area ratio of the total of the dark shaded parts to the total of the hatched parts [i.e. (the total of the area where reflected light from the outside of the pit Pa is received)/(the total of the area where reflected light from the pit Pa is received)] in the areas d4 and d5 is higher than those of any other combinations. Accordingly, the output of the sum signal d45 for the detection signals from the light receiving areas d4 and d5 is maximum. Therefore, the digital signal S45 is detected as a signal having a maximum value at the maximum value detection circuit 39 and then entered to the code data generation circuit 40. In the code data generation circuit 40, the digital signal S45 is coded to "00" as shown in FIG. 5(c) and the code "00" is sent to the demodulation circuit 41.

Figures 6A, 6B, 6C:
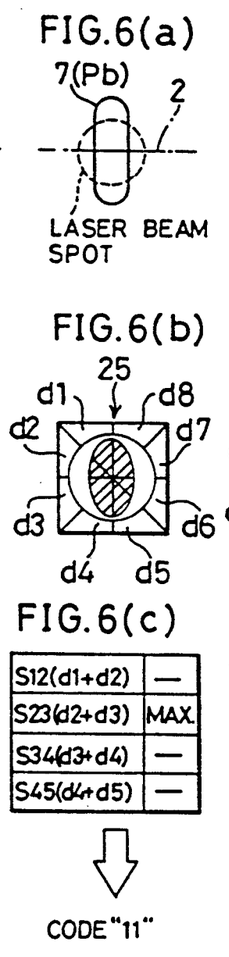

When a laser beam spot is projected to the pit Pb as shown in FIG. 6(a), the light intensity in the adjacent light receiving areas d2 and d3 is the highest, where (the total of the area where reflected light from the outside of the pit Pb is received)/(the total of the area where reflected light from the pit Pb is received) ratio is maximum. The output of the sum signal d23 for the signals detected at the light receiving areas d2 and d3 is maximum. Therefore, the digital signal S23 is selected as a signal having a maximum value in the maximum value detection circuit 39 and sent to the code data generation circuit 40. In the code data generation circuit 40, the code "11" is generated as shown in FIG. 6(c).

Figures 7A, 7B, 7C:
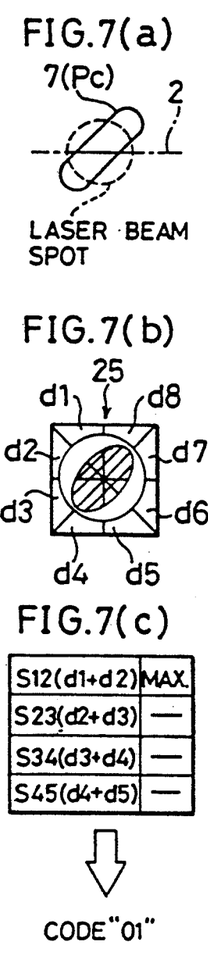
Figures 8A, 8B, 8C:
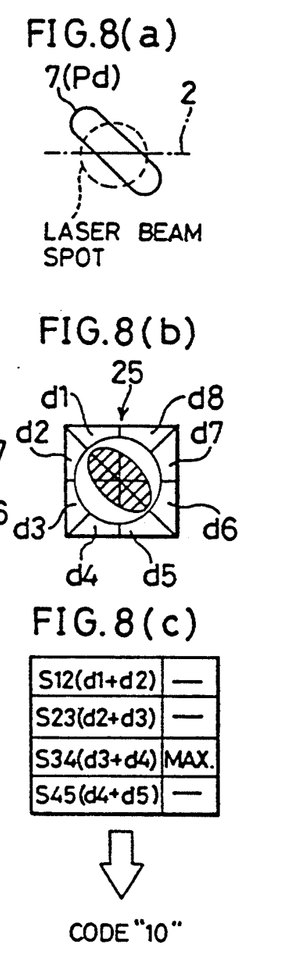

Likewise, when a laser beam spot is projected to the pit Pc as shown in FIG. 7(a), the output of the sum signal d12 is maximum as shown in FIG. 7(b), and the code "01" is generated as shown in FIG. 7(c) according to the digital signal S12. When a laser beam spot is projected to the pit Pd as shown in FIG. 8(a), the sum signal d34 is maximum as shown in FIG. 8(b) and the code "10" is generated as shown in FIG. 8(c), according to the digital signal S34.

As described above, four types of inclines of the pits 7 with respect to the track direction are respectively converted to a predetermined code constructed by two bits, i.e., 0 and 1, so as to be read out as information. With the use of the optical recording element and optical data retrieval system of the present invention, not only is information volume doubled compared to the prior art, but also the transmission speed at the time of playback is highly improved as the number of bits increases.

In the foregoing embodiment, there are provided in the data region 3a formed on the track 2 of the optical disk 1, four types of long thin pits 7, that is, pits inclined at 0°, 90° and substantially 45° in a clockwise direction and counterclockwise direction with respect to the track direction, and according to the number of types of pits, the light receiving surface of the photodetector 25 is equally divided into eight divisions. Further, four adders 31 to 34 and four A/D converters 35 to 38 (the numbers of adders and A/D converters are equal to the number of types of the pits) are provided in the pit recognition circuit 30. However, the invention is not limited to the above arrangement.

As described above, the optical recording element of the invention is characterized in that alignments of long thin pits are formed on the tracks, the pits being inclined in various directions with respect to the track. direction and according to the different types of inclines, information is recorded.

The optical data retrieval system of the invention for use with the optical recording element is characterized in that the pit alignments are scanned with a laser beam spot and the incline of a pit is detected by obtaining the distribution of the intensity of the reflected light caused by the light diffraction at the pit, in order to play back information based on the incline.

In such an arrangement, information volume per pit increases since information is not recorded by the presence/absence of a pit but recorded by the different inclines of pits. This allows the optical recording element to perform higher-density and larger-volume recording, and highly improves the transmission speed at the time of playback, without shortening the length of the pits to reduce the spacing therebetween and reducing the track pitch.

In the optical data retrieval system, a laser beam spot is irradiated on the pit formed on the optical recording element and the distribution of the reflected light intensity is obtained, thereby detecting the incline of the pit, so that the substantially same structure as that of a standard type data retrieval system can be adapted without making any complicated change. Furthermore, the pit spacing and track pitch in the optical recording element are not reduced, with the result that there is no need for a drastic improvement in the frequency characteristic of the optical head and cross-talk is less likely to occur.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical data retrieval system for playing back of information from an optical recording element having a plurality of track elements extending end to end in a track direction and a recording surface on one side thereof, each track element having a plurality of elongated pits coplanar with the recording surface and angled within a full range of 360 degrees with respect to the track direction, the optical recording element being designed such that information is recorded therein according to the respective angle of each of the pits to the track direction, comprising:

laser light means for directing an information bearing laser light onto said optical recording element; and pit recognition retrieval means for playing back of information by encoding the respective angle of each of said elongated pits within the full range of 360 degrees to the track direction by detecting the distribution of the intensity of reflected light from each angled pit of the optical recording element on which a laser beam spot is irradiated.

2. The optical data retrieval system according to claim 1 wherein each track element includes a servo sector and a data storage sector.

3. The optical data retrieval system according to claim 2 further comprising:

focus and tracking servo control means for adjusting said laser light means so the laser light remains aligned and focused with respect to said plurality of track elements;

said pit recognition retrieval means reading information stored in the servo sector of each track element and generating, therefrom, a channel clock signal synchronously with scanning said track elements for controlling said servo control means.

4. An optical data retrieval system according to claim 3, further comprising an optical pick-up device which includes:

a first photodetecting means for generating a control signal used for controlling said focus servo control means upon receipt of reflected light;

a second photodetecting means for generating detection signals used for the playback of information; and an optical system directing means for projecting said laser light beam to produce a spot on the optical recording element and guiding reflected light from said optical recording element to both the first and second photodetecting means.

5. An optical data retrieval system according to claim 4, wherein the second photodetecting means comprises a light receiving surface equally divided into a plurality of light receiving areas so that the light receiving areas are equal in size.

6. An optical data retrieval system according to claim 5, further comprising:

a total signal generation circuit for generating a total signal by summing the detection signals generated by the second photodetecting means which vary depending on the amount of light reflected from each of the angled pits of the optical recording element;

a tracking servo circuit for generating and releasing a control signal for controlling said tracking servo means;

a focus servo circuit for generating and releasing a control signal for controlling the focus servo control means; and a channel clock signal generation circuit for generating a channel clock signal synchronously with the playback of information stored in each sector of the optical recording element and releasing the channel clock signal to said pit recognition means, the tracking servo circuit, and the focus servo circuit.

7. An optical data retrieval system according to claim 6, wherein the tracking servo circuit releases a control signal to the optical pick-up device upon receipt of a channel clock signal from the channel clock signal generation circuit so that the levels of total signals respectively generated from a pair of pits formed in the servo area of the optical recording element are equal, thereby controlling the tracking servo mechanism.

8. An optical data retrieval system according to claim 6, wherein the focus servo circuit generates a control signal by astigmatism and releases it to the optical pick-up device, upon receipt of a channel clock signal from the channel clock signal generation circuit, so as to control said focus servo means, the control signal being generated in response to output from said first photodetecting means.

9. An optical data retrieval system according to claim 6, wherein the pit recognition retrieval means comprises:

a plurality of adders for generating a sum signal from analog signals which vary in accordance with the respective amounts of light received at two adjacent light receiving areas out of a plurality of equally divided light receiving areas on the light receiving surface of the second photodetecting means;

a plurality of A/D converters, a selected one of said converters being connected to each adder for converting the sum signal to a digital signal upon receipt of a channel clock signal from the channel clock signal generation circuit;

a maximum value detection circuit for selecting a digital signal having a maximum value from the plurality of digital signals entered from the A/D converter; and a code data generation circuit for converting the selected signal having a maximum value to a code which is prefixed for every digital signal.

10. An optical data retrieval system according to claim 6, wherein said channel clock signal generation circuit being connected to said total signal generation circuit generates a channel clock signal by PLL method based on the total signal of the pits formed at the center of the track in the servo area, the total signal being generated by said total signal generation circuit.

11. A optical data retrieval system according to claim 9, wherein the number of adders and the number of A/D converters are respectively equal to a number corresponding to an amount of different types of elongated thin pits formed in the data area for storing information on the optical recording element.

12. An optical data retrieval system according to claim 9, wherein the maximum value detection circuit selects a digital signal as a signal having a maximum value, the digital signal being generated by converting a sum signal of the detection signals obtained from two adjacent light receiving areas where the ratio of the total of the area where reflected light from the outside of the pit is received to the total of the area where reflected light from the pit is received is the highest in the combinations of two adjacent light equally divided receiving areas on the light receiving surface of the second photodetecting means.

13. An optical recording element for storing information, comprising:
  a substrate with a recording surface on one side thereof having a plurality of track elements extending end to end in a track direction; and
  a plurality of elongated pits having substantially uniform width and length and being disposed within each of the track elements and coplanar with the recording surface, each of the pits being angled with respect to the track direction, the angle of the pits being selected from a plurality of angles predetermined within 360 degrees so that the angle of the pit assigns at least two bits of data to each pit.

14. The optical element according to claim 13 wherein each track element includes a servo sector and a data storage sector.

15. An optical recording element according to claim 14, wherein each data storage sector has a storage capacity of 8 bytes and each servo sector has a storage capacity of 2 bytes.

16. An optical recording element according to claim 14, wherein each servo sector comprises:

a first group of pits formed on the center of each of the track elements and used for the generation of a channel clock signal;
  a second group of pits, arranged in pairs in each of said track elements, which are used for controlling a tracking servo mechanism, said second group of pits being arranged with the track element therebetween and each being equidistant from the center of the track element in a radial direction sot hat a laser light beam spot is not irradiated onto more than one of said elongated pits at a same time; and
  a mirror section used for controlling the focus servo mechanism, wherein said mirror section is substantially flat and has no pit therein.

17. An optical data retrieval system for playing back of information from an optical recording element having a substrate and a plurality of track elements extending end to end in a track direction, each of the track elements having a plurality of elongated pits coplanar with a recording surface parallel to the substrate, each of the pits being angled with respect to the track direction, the angle being selected from a plurality of angles predetermined within 360 degrees so as to assign at least two bits to each of the pits, comprising:
  light generation means for converting light in order onto each of the pits;
  light receiving means, provided with a plurality of light receiving sections, for receiving light reflected from each of the pits and for detecting a intensity distribution of the reflected light on the light receiving sections;
  maximum value detection means for detecting a specific light receiving section of the light receiving sections which detects a maximum value of the intensity distribution;
  coded data generation means, connected to an output of the maximum value detection means, for generating coded data composed of at least two bits corresponding to the maximum value; and
  demodulation means, connected to an output of the coded data generation means, for demodulating the coded data.

* * * * *